United States Patent
Hellgren et al.

(10) Patent No.: US 10,272,853 B2
(45) Date of Patent: Apr. 30, 2019

(54) INSULATION MEMBER

(71) Applicant: Volvo Car Corporation, Gothenburg (SE)

(72) Inventors: Martin Hellgren, Askim (SE); Thomas Fransson, Gothenburg (SE)

(73) Assignee: Volvo Car Corporation, Gothenburg (SE)

(*) Notice: Subject to any disclaimer, the term of this patent is extended or adjusted under 35 U.S.C. 154(b) by 4 days.

(21) Appl. No.: 15/458,216

(22) Filed: Mar. 14, 2017

(65) Prior Publication Data

US 2017/0291559 A1 Oct. 12, 2017

(30) Foreign Application Priority Data

Apr. 11, 2016 (EP) ..................................... 16164715

(51) Int. Cl.
*B60R 13/08* (2006.01)
*B62D 65/02* (2006.01)
*B62D 29/00* (2006.01)

(52) U.S. Cl.
CPC .......... *B60R 13/08* (2013.01); *B60R 13/0815* (2013.01); *B62D 29/002* (2013.01); *B62D 65/024* (2013.01)

(58) Field of Classification Search
CPC ... B60R 13/08; B60R 13/0815; B62D 65/024; B62D 29/002
See application file for complete search history.

(56) References Cited

U.S. PATENT DOCUMENTS 5,811,167 A * 9/1998 Norvell ................... B29C 65/02
428/76

FOREIGN PATENT DOCUMENTS

| DE | 10 2006 040 31 A1 | 4/2007 |
|---|---|---|
| EP | 0818374 A1 | 1/1998 |
| JP | S6354217 A | 3/1988 |
| WO | 98/59125 A1 | 12/1998 |

* cited by examiner

*Primary Examiner* — D Glenn Dayoan
*Assistant Examiner* — Melissa A Black
(74) *Attorney, Agent, or Firm* — Snyder, Clark, Lesch & Chang, LLP

(57) ABSTRACT

The present disclosure relates to an insulation member for a hollow space of a vehicle bodywork. The insulation member comprises an expandable insulation body and a gas-impermeable cover. The cover comprises a yieldable chamber portion enclosing the expandable insulation body, wherein a pressure inside the chamber portion in a non-expanded state of the insulation member is less than atmospheric pressure. The cover further comprises at least one attachment portion adapted for attachment to the vehicle bodywork. The disclosure further relates to a vehicle comprising the insulation member, a use of the insulation member, a method of manufacturing an insulation member and a method of mounting an insulation member.

15 Claims, 3 Drawing Sheets

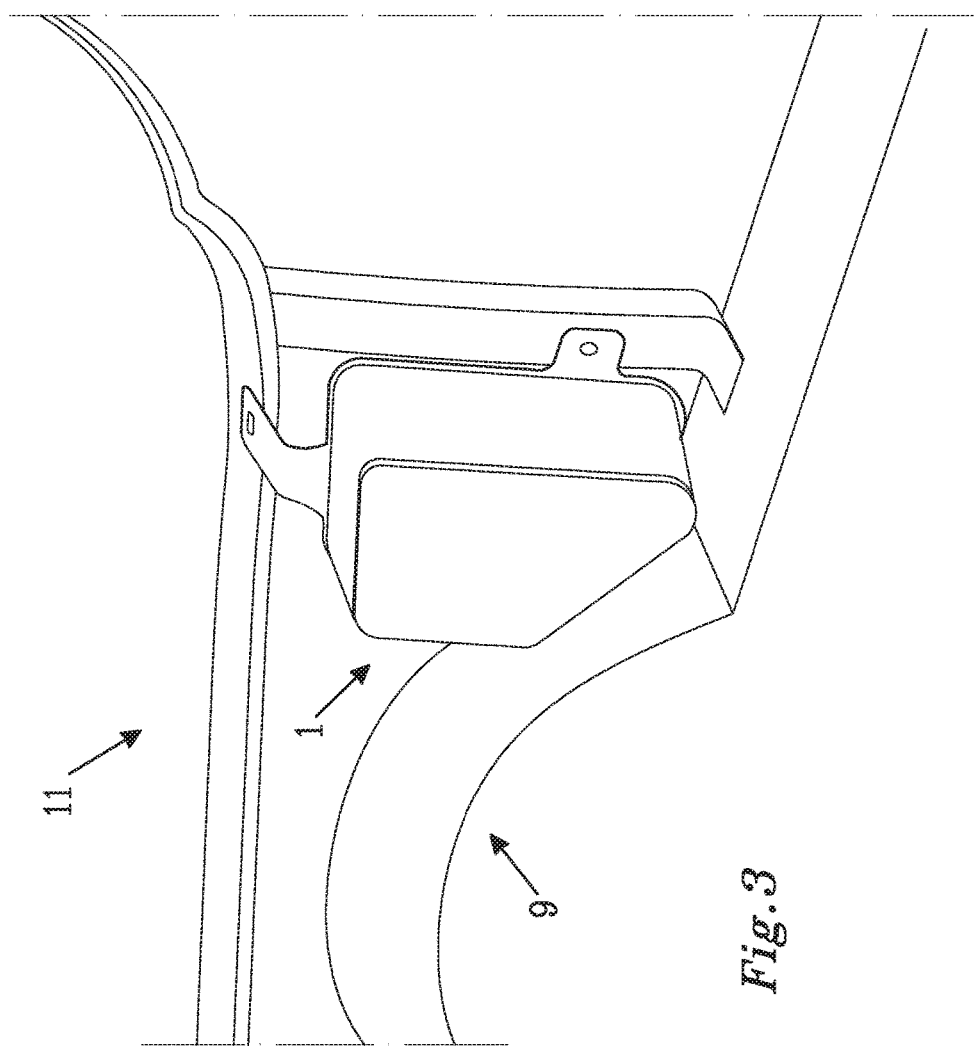

INSULATION MEMBER

RELATED APPLICATION

This application claims priority under 35 U.S.C. § 119 based on European Patent Application No. 16164715.1, filed Apr. 11, 2016, the disclosure of which is hereby incorporated by reference herein.

TECHNICAL FIELD

The present disclosure relates to an insulation member for a hollow space of a vehicle bodywork. The disclosure further relates to a use of the insulation member and to a method of manufacturing an insulation member.

BACKGROUND

It is known to use an expandable insulation member in a hollow space of a vehicle bodywork for acoustic and thermal insulation. As an example, patent document DE 10 2006 040 312 A1 discloses a filling body composed of foam material within a film covering. The volume of the foam flocking or fragment material is compressed to admit a spatial expansion of 20-100 millimeters (mm).

However, it may sometimes be difficult to place the insulation member in the desired location in the hollow space. Measures may have to be taken when mounting the insulation member in the vehicle bodywork to place it correctly, which measures may take some time and cause some costs. There is thus a desire for an insulation member which may be mounted in a less complicated way in the vehicle bodywork.

SUMMARY

Aspects of the present disclosure may overcome or ameliorate at least one of the disadvantages of the prior art, or to provide a useful alternative.

The aspects of the present disclosure may be achieved by the subject-matter of claim 1. Embodiments are set forth in the appended dependent claims, in the following description and in the drawings.

Thus, the present invention is related to an insulation member for a hollow space of a vehicle bodywork. The insulation member comprises an expandable insulation body and a gas-impermeable cover. The cover comprises a yieldable chamber portion enclosing the expandable insulation body, wherein a pressure inside the chamber portion in a non-expanded state of the insulation member is less than atmospheric pressure. The cover further comprises at least one attachment portion adapted for attachment to the vehicle bodywork.

The hollow space is located inside the vehicle bodywork, e.g. inside a front fender, inside a rear fender or inside a pillar. The hollow space may have closed walls forming a cavity, or the hollow space may be open at at least one side.

The insulation member may be used as NVH-insulation, i.e. noise, vibration and heat insulation. The insulation member has a non-expanded state and an at least partly expanded state. The insulation member is manufactured in the non-expanded state. Further, the non-expanded state is used during transporting and storing the insulation member. The at least partly expanded state is used when the insulation member has been mounted in the vehicle.

The insulation body comprises an expandable material, e.g. a volume-compressible material, such as foam, which may be made of PUR, polyurethane. The insulation body is expandable at least in a main expansion direction.

The cover is made of a gas-impermeable material, e.g. a polymer film. The cover should be impermeable at least to air, which comprises oxygen, nitrogen, carbon dioxide and water vapor. The cover may be colored, e.g. black. The cover may comprise a multilayer polymer film structure. The polymer film may be thermo-formable. Commonly known polymers such as PE, polyethylene, and PA, polyamide, may be used, alone or in combinations. It is desirable that the material of the cover has properties like a high mechanical flexibility, a broad sealing range, good gas-impermeability properties, a good mechanical behaviour after thermoforming, a high toughness and/or a high impact resistance.

As regards the main gases of air, the material of the cover may be chosen to have an oxygen-permeability less than 60 $cm^3/(m^2 * day * bar)$, preferably less than 50 $cm^3/(m^2 * day * bar)$, more preferably less than 40 $cm^3/(m^2 * day * bar)$. The nitrogen permeability may be less than 40 $cm^3/(m^2 * day * bar)$, preferably less than 30 $cm^3/(m^2 * day * bar)$, more preferably less than 20 $cm^3/(m^2 * day * bar)$. The carbon dioxide permeability may be less than 200 $cm^3/(m^2 * day * bar)$, preferably less than 160 $cm^3/(m^2 * day * bar)$, more preferably less than 140 $cm^3/(m^2 * day * bar)$. The values of gas-permeability are given as measured according to test method DIN 53380.

The insulation member is enclosed in a chamber portion of the cover. The chamber portion is yieldable such that it can expand together with the expandable insulation body, when the insulation member goes from the non-expanded state to an at least partly expanded state. Since the chamber portion is yieldable, its volume can expand. Purely as an example, the material of the cover may be stretchable, such that the expanding insulation body stretches the material. As another example, the chamber portion may comprise superfluous cover material, the volume of which is shrunk due to the under-pressure in the non-expanded state.

In the non-expanded state, the pressure inside the chamber portion is less than atmospheric pressure, e.g. 10% less than atmospheric pressure or 20% less than atmospheric pressure or 50% less than atmospheric pressure. Since the pressure is less inside the chamber portion than outside the chamber portion, wherein the ambient air has atmospheric pressure, the higher outside pressure will press on the chamber portion preventing it from expanding, and thereby yielding, as long as the cover of the chamber portion is not ruptured. Further, due to the gas-impermeable nature of the cover, gas will not gradually enter into the chamber portion, or at least not in such a flow rate that it would change the state of the insulation member from non-expanded to at least partly expanded.

However, once the gas-impermeable nature of the cover is changed, e.g. by making a puncture hole in the chamber portion, air or another gas will enter the chamber portion, and the pressure in the chamber portion will rise. The enclosed insulation body will expand. The chamber portion will yield, such that its volume is increased. The chamber portion may thereby be pushed by the expanding insulation body. The larger the puncture hole is, the quicker the gas will enter the chamber portion. Usually, it is preferred that the insulation member reaches the at least partly expanded state in 1-60 seconds, such as in 5-20 seconds. Purely as an example, for an insulation member for the front fender, it has been found appropriate to use a puncture hole in the shape of a slit having a size between 2 and 10 mm, e.g. 5 mm.

Thereby the insulation member will reach the at least partly expanded state in about 5-20 seconds, e.g. in about 10-15 seconds.

The insulation member is its non-expanded state when being inserted into the hollow space in the vehicle bodywork. Once the insulation member has obtained its desired position in the hollow space, the gas-impermeable nature of the chamber portion is changed, e.g. by making the puncture hole in the chamber portion, such that the insulation body expands and at least partly fills the hollow space, the insulation member thereby going to an at least partly expanded state.

The chamber portion may have a predefined puncture location, in which the puncture hole in the chamber portion is intended to be made. The material of the cover may e.g. be locally weakened in the puncture location. As an alternative, or a complement, the chamber portion may comprise a purposely made fold, which is easy to cut. As yet an alternative or complement, the chamber portion may comprise a portion, e.g. in the shape of a tap, protruding from the rest of the chamber portion and which is easy to cut. The puncture hole may be made manually, e.g. by means of a scissor or a knife. As an alternative, the puncture hole may be made by a sharp tip located in the hollow space into which the insulation member is to be mounted.

The cover may enclose the insulation body also in the at least partly expanded state and may then help to protect the insulation body from moisture both in the non-expanded state and in the at least partly expanded state. The location of the puncture hole may be purposely selected, such that the puncture hole has no influence, or only a negligible influence, on the moisture protection effect of the cover.

It would also be possible that the cover located in the chamber portion is ruptured, ripped open or even ripped off to reach the at least partly expanded state. However, it is preferred that the cover encloses the insulation body also in the at least partly expanded state to obtain the moisture protection effect.

The thickness of the insulation member in the non-expanded state, as seen in the direction of expansion, may depend on how low the pressure is in the chamber portion. Different thicknesses may be obtained dependent on which under-pressure is used and/or to what degree the insulation body is compressed. The thickness of the insulation member in the at least partly expanded state, and hence the degree of expansion, as seen in the direction of expansion, may depend on the available expansion space in the hollow space of the vehicle bodywork. A theoretical maximal expansion thickness, i.e. without any outer restrictions, may be determined by the material properties of the insulation body. However, when mounted in the hollow space, the degree of possible expansion is given by the available space, which may be less than the theoretical maximal expansion.

Purely as an example, the thickness of the insulation member may be in the range of from 5 mm to 50 mm, preferably in the range of from 10 mm to 25 mm. In the at least partly expanded state, the thickness may be in the range of from 60 mm to 200 mm, preferably 100 mm to 150 mm. The theoretical maximal expansion thickness may be 5 mm to 30 mm more than the thickness in the at least partly expanded state, e.g. 10 mm to 20 mm more. These thicknesses are suitable for mounting the insulation member in the front fender. If the insulation member is to be mounted in another location in the vehicle, other thicknesses may be more appropriate. The thickness in the at least partly expanded state may be at least twice, preferably at least five times greater than in the non-expanded state.

By providing at least one attachment portion in the cover adapted for attachment to the vehicle bodywork, the mounting of the insulation member in the hollow space is made less complicated. The at least one attachment portion may e.g. be attached to a beam or another sub-structure of the vehicle bodywork, when the insulation member is being mounted. The at least one attachment portion will also help to keep the insulation member in place when it is located in the vehicle, e.g. when driving the vehicle.

It has been found suitable to have at least two attachment portions, preferably being directed in two different directions in relation to the chamber portion, since the insulation member thereby more easily can be held in a fixed position in relation to the vehicle bodywork. Once the insulation body has been allowed to expand, the insulation member will also be held in the hollow space by the expansion forces, assuming the actual thickness in the at least partly expanded state is less than the theoretical maximal expansion thickness.

The at least one attachment portion is preferably located in a portion of the cover being less yieldable than the chamber portion or not being yieldable at all. Due to the flexibility of the material of the cover, e.g. the polymer film, the at least one attachment portion may be bent or folded, such that it e.g. can reach a beam, which is displaced in a lateral direction in relation to the insulation member when mounted in the vehicle.

The at least one attachment portion may go around the whole, or substantially the whole circumference of the chamber portion.

The at least one attachment portion may form an ear-shaped structure or a flap protruding from the chamber portion.

The at least one attachment portion may protrude in relation to the chamber portion. Preferably the attachment portion extends at least 10 mm from the chamber portion as measured along a surface of the attachment portion, more preferably at least 20mm, most preferably at least 40 mm. Since the at least one attachment portion protrudes form the chamber portion, it can easily be attached to e.g. a beam or another sub-structure of the vehicle bodywork.

The attachment portion may comprise at least one aperture and/or indicium for an aperture. The aperture may be an opening having a predefined opening area, a cut or a slot. The aperture provides possibility for easy attachment in the vehicle bodywork. Purely as an example, a bolt or a screw may go through the aperture. Since the aperture is in the at least one attachment portion, and thus outside the chamber portion, the under-pressure of the chamber portion is not influenced by the aperture.

The indicium for an aperture is a portion of the attachment portion being prepared to become an aperture, e.g. a local weakening, such as a perforation. The actual opening of indicium such that it becomes an aperture may be made manually, e.g. by breaking the perforation. This may be made before or during mounting of the insulation member in the hollow space.

As an alternative, an aperture may be made by a sharp tip located in the hollow space into which the insulation member is to be mounted, e.g. during mounting of the insulation member in the hollow space.

As yet an alternative, or a complement, the at least one attachment portion may have a shape facilitating easy attachment to the vehicle bodywork, e.g. forming a hook shape.

The chamber portion is at least partly surrounded by a seal, the seal preferably having a width in the range of from 1 mm to 20 mm, more preferably having a width in the range of from 2 mm to 15 mm, most preferably having a width in the range of from 3 mm to 10 mm. The seal may be formed by welding and/or an adhesive. The seal is gas-impermeable. The width of the seal is typically determined in a direction being perpendicular to the main extension direction of the seal.

The cover may comprise, or consist of, a first layer of cover material joined to a second layer of cover material with the insulation body located in between the first and second layers of cover material. In that case, the seal may completely surround the chamber portion. The layers of cover material may be provided in the form a sheet or a web rolled off from a roll.

As an alternative, a single sheet or a single web may be folded around the insulation member, thus forming both the first and second layers of cover material. As yet an alternative, the cover material may be provided as a tube and the insulation body inserted into the tube, the tube being shrunk by the under-pressure. In the two latter cases, the above-mentioned seal will only partly surround the chamber portion.

The attachment portion may be formed by one of the layers. However, it is generally preferred that the attachment portion comprise both layers.

The at least one attachment portion may be at least partly surrounded by an attachment portion seal. The attachment portion seal may reinforce the attachment portion. The attachment portion seal preferably follows the edge of the attachment portion. The whole attachment portion may be sealed or the seal may be located along the edge only.

If the at least one attachment portion comprises an aperture and/or an indicium for an aperture, the aperture and/or indicium for an aperture may be at least partly surrounded by an aperture seal. The aperture seal may be combined with the attachment portion seal. It would also be feasible with an aperture seal being separate from the attachment portion seal, at least partly surrounding the aperture and/or indicium for an aperture. As yet an alternative, an aperture and/or indicium for an aperture may be provided without a surrounding seal.

If using the above-mentioned first and second layers of cover material, the first layer of cover material and the second layer of cover material may be two-dimensional mirror images to each other as seen in a main plane of the insulation member. Further, the first and second layers of cover material may have the same extension in the non-expanded state in a direction being perpendicular to the main plane, thus forming three-dimensional mirror images. This direction usually coincides, or substantially coincides with, the expansion direction of the insulation body. However, the extension in that direction of the first layer may differ from that of the second layer in the non-expanded state. It may even be so that one of the first and second layers forms a substantially planar surface.

The invention is further related to a fender, e.g. a front fender or a rear fender, comprising an insulation member as described herein, wherein the insulation member is arranged in a hollow space of the fender, such that the at least one attachment portion is used to hold the insulation member in a predefined position in the hollow space. In an at least partly expanded state the insulation member at least partly fills the hollow space.

The invention is also related to a vehicle comprising a vehicle bodywork with a hollow space and an insulation member as described herein, wherein the insulation member is arranged in the hollow space, such that the at least one attachment portion is used to hold the insulation member in a predefined position in the hollow space. In an at least partly expanded state, the insulation member at least partly fills the hollow space. The shape of the insulation body is preferably chosen after the hollow space, in which the insulation member is to be located.

The invention is further related to a use of the insulation member as described herein for at least partly filling a hollow space of a vehicle bodywork, e.g. in a fender.

The invention is also related to a method of manufacturing an insulation member, the method comprising
a) providing a first layer of gas-impermeable cover material,
b) providing an expandable insulation body on top of the first layer of cover material,
c) providing a second layer of gas-impermeable cover material on top of the insulation body,
d) compressing the insulation body,
e) sealing the first and second layers of cover material around the insulation body while applying a pressure less than atmospheric pressure, thereby forming a cover with a yieldable chamber portion enclosing the insulation body, wherein a pressure inside the chamber portion is less than atmospheric pressure, the cover further providing at least one attachment portion.

The method may thus be used to manufacture the insulation member as described herein.

The method may further comprise
f) cutting the first and second layers of cover material to obtain a predefined shape of the insulation member.

As an alternative to cutting, the first and second layers of cover material may be provided pre-cut, i.e. having the desired shape, e.g. as pre-cut sheets.

Steps d) and e) may be performed at the same time in a common step. The optional step f) may be combined with step e) or with steps d) and e).

The method may further comprise providing an attachment portion seal as described herein at least partly surrounding the attachment portion. The attachment portion seal may be added in step e) above or may be a separate additional sealing step.

As an option, the method may comprise providing at least one aperture and/or indicium for an aperture in the attachment portion. In that case, the above-mentioned step e) of sealing, or a separate additional step, may as an option comprise providing the aperture seal as described herein.

The invention is further related to a method of mounting an insulation member as described herein in a hollow space of a vehicle bodywork, the method comprising:
inserting the insulation member in the non-expanded state into the hollow space,
attaching the attachment portion to the vehicle bodywork,
allowing gas to enter the chamber portion, the insulation member thereby expanding to the at least partly expanded state, in which it at least partly fills the hollow space.

BRIEF DESCRIPTION OF THE DRAWINGS

The present invention will hereinafter be further explained by means of non-limiting examples with reference to the appended drawings wherein:
FIG. 3 illustrates the insulation member mounted in a vehicle.

It should be noted that the appended drawings are not necessarily drawn to scale and that the dimensions of some features of the present invention may have been exaggerated for the sake of clarity.

DETAILED DESCRIPTION

The invention will, in the following, be exemplified by embodiments. It should however be realized that the embodiments are included in order to explain principles of the invention and not to limit the scope of the invention, as defined by the appended claims. Details from two or more of the embodiments may be combined with each other.

Figure 1:
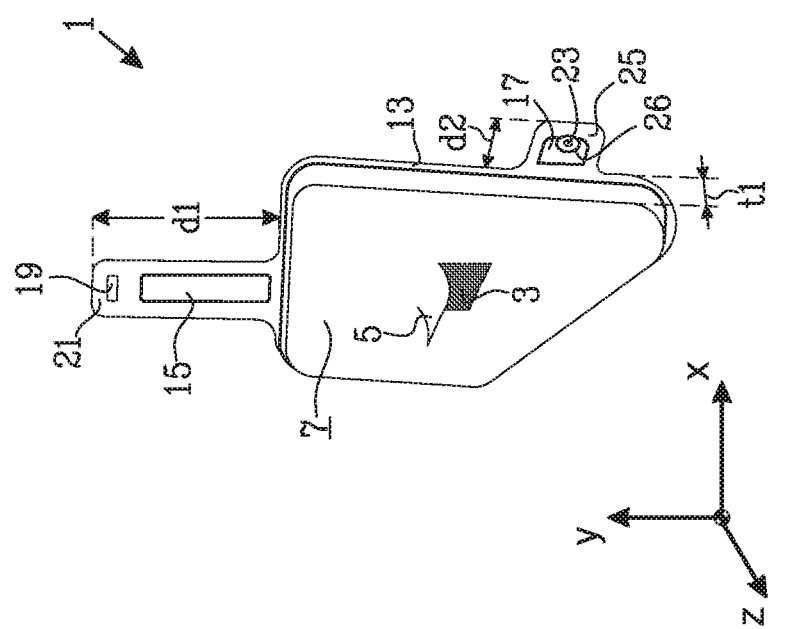
FIG. 1 is a perspective view of an insulation member according to the invention in a non-expanded state.

FIG. 1 illustrates an insulation member 1 according to the invention in a non-expanded state. The insulation member 1 is intended to be used in a hollow space of a vehicle bodywork. The insulation member 1 may be used as NVH-insulation, i.e. noise, vibration and heat insulation. The insulation member 1 comprises an expandable insulation body 3 and a gas-impermeable cover 5.

The insulation body 3 extends in a plane spanned by an x-direction and a y-direction. The insulation body 3 comprises a volume-compressible material, such as foam, e.g. made of PUR, polyurethane. The cover 5 comprises a yieldable chamber portion 7 enclosing the insulation body 3. In the non-expanded state of the insulation member 1, as in FIG. 1, the pressure inside the chamber portion 7 is less than atmospheric pressure. The insulation body 3 has a first thickness $t_1$ in the non-expanded state, e.g. being compressed to the first thickness $t_1$. The chamber portion 7 of the cover 5 retains the insulation body 3 in the non-expanded state due to the under-pressure in the chamber portion 7.

Figure 2:
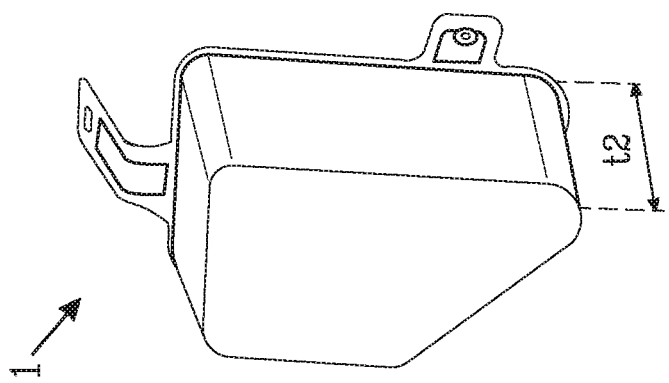
FIG. 2 is a perspective view of the insulation member in an at least partly expanded state.

However, once the gas-impermeable nature of the cover 5 is changed, e.g. by making a puncture hole in the chamber portion 7, air or another gas will enter the chamber portion 7 and the pressure in the chamber portion 7 will rise. Thereby the chamber portion 7 and the enclosed insulation body 3 will expand at least in the z-direction. See FIG. 2 showing the insulation member 1 in an expanded state, wherein it has a second thickness $t_2$ being larger than the first thickness $t_1$. The chamber portion 7 is yieldable such that it can expand together with the expandable insulation body 2.

The cover 5 is made of a gas-impermeable material, e.g. a polymer film. The cover 5 should at least be impermeable to air.

The insulation member 1 having the shape illustrated FIGS. 1 and 2 is intended to be mounted inside a front fender 9 of a vehicle 11 as schematically indicated in FIG. 3. When mounted in the front fender 9, the x-direction of the insulation member 1 substantially corresponds to a longitudinal direction of the vehicle 11, the y-direction of the insulation member 1 substantially corresponds to a height direction of the vehicle 11, and the z-direction of the insulation member 1 substantially corresponds to a lateral direction of the vehicle 11. Insulation members having other shapes may be intended for other hollow spaces of the vehicle bodywork.

The insulation member 1 is in its non-expanded state when inserted into the hollow space in the vehicle bodywork. Once the insulation member 1 has obtained its desired position in the hollow space, the gas-impermeable nature of the chamber portion 7 is changed, e.g. by making a puncture hole in the chamber portion 7, such that the insulation body 3 expands in the z-direction and at least partly fills the hollow space. The cover 5 encloses the insulation body 3 also in the at least partly expanded state and will help to protect the insulation body 3 from moisture both in the non-expanded state and in the at least partly expanded state.

The chamber portion may have a predefined puncture location, in which the puncture hole in the chamber portion is intended to be made. The material of the cover 5 may e.g. be locally weakened. As an alternative, or a complement, the chamber portion 7 may comprise a purposely made fold, which is easy to cut. As yet an alternative or complement, the chamber portion 7 may comprise a portion, e.g. in the shape of a tap, protruding from the rest of the chamber portion 7 and which is easy to cut.

The insulation body 3 extends in the x-y-plane, which is best seen in FIG. 1. The shape of the insulation body 3 is preferably chosen after the hollow space, in which the insulation member 1 is to be located. The cover 5 has a larger projected area in the x-y plane than the insulation body 3.

A seal 13 at least partly, in the illustrated case completely, surrounds the chamber portion 7. The seal 13 has a width in the range of from 1 mm to 20 mm, more preferably in the range of from 2 mm to 15 mm, most preferably in the range of from 3 mm to 10 mm. The seal 13 may be formed by welding and/or an adhesive. The seal 13 is gas-impermeable.

The cover 5 comprises at least one attachment portion adapted for attachment to the vehicle bodywork. In the illustrated embodiment, there are two attachment portions, a first 15 and a second 17. Preferably, the attachment portions 15, 17 are located in a non-yieldable part of the cover 5. The attachment portions 15, 17 protrude in relation to the chamber portion 7, when the insulation member 1 is in its non-expanded state as in FIG. 1, forming ear-shaped structures or flaps. The attachment portions 15, 17 extends a distance, $d_1$ and $d_2$ respectively, of at least 10 mm from the chamber portion 7 as measured along a surface of the attachment portion 15, 17, preferably at least 20 mm, more preferably at least 30 mm, most preferably at least 40 mm.

When the insulation member 1 is being mounted in the vehicle 11 and when it has been mounted in the vehicle 11, the attachment portions 15, 17 hold the insulation member 1 in a desired location in the hollow space. It has been found to be suitable to use at least two attachment portions 15, 17 protruding in two different directions, since the insulation member 1 thereby can be held in a fixed position as seen in its x-y plane. Once the insulation body 3 has been allowed to expand, the insulation member 1 will also be held in the z-direction by the expansion forces of the insulation body 3.

FIG. 1 illustrates the insulation member 1 in the non-expanded state. The attachment portions 15, 17 thereby protrude in the x-y plane from the chamber portion 7. However, due to a flexible nature of the material of the cover 5, the attachment portions 15, 17 may be bent or folded out of the x-y-plane, as may be seen in FIGS. 2 and 3, wherein the first attachment portion 15 is bent, such that it also at least partly extends in the z-direction, which is helpful when mounting the insulation member 1 in the vehicle 9.

The first attachment portion 15 is provided with an aperture 19, which is useful when mounting the insulation member 1 in the vehicle 9. The aperture 19 may e.g. be placed around a bolt or other protrusion in the vehicle bodywork.

An attachment portion seal 21 follows an edge of the first attachment portion 15. In the illustrated embodiment, the attachment portion seal 21 also surrounds the aperture 19. The attachment portion seal 21 reinforces the attachment portion 15. The attachment portion seal 21 preferably follows the edge of the attachment portion 15. The whole attachment portion 15 may be sealed or the seal may be located along the edge only, as is illustrated in FIG. 1. It would also be feasible with an aperture seal, being separate from the attachment portion seal 21, at least partly surrounding the aperture 19, or having an aperture 19 without a surrounding seal.

In a corresponding way, the second attachment portion 17 is provided with an aperture 23. An attachment portion seal 25 follows an edge of the second attachment portion 17. The aperture 23 of the second attachment portion 17 is surrounded by an aperture seal 26, which reinforces the aperture 23.

In the illustrated embodiment of FIGS. 1-3, the cover 5 comprises a first layer of cover material joined to a second layer of cover material with the insulation body 3 located in between the first and second layers of cover material. A method of manufacturing the insulation member 1 is further described below in conjunction with FIG. 4. The seal 13 holds the first and second layers of cover material together, such that the chamber portion 7 is formed. The attachment portions 15, 17 may be formed by one of the layers. However, it is generally preferred that the attachment portions 15, 17 comprise both layers, as in the illustrated embodiment, since that will result in a stronger attachment portion 15, 17.

Figure 4:
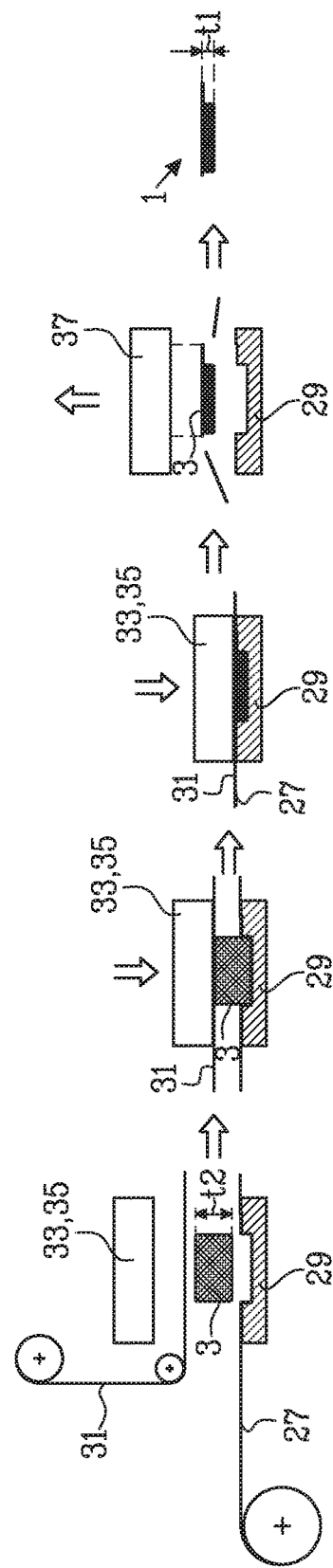
FIG. 4 illustrates a method of manufacturing an insulation member.

FIG. 4 schematically illustrates a method of manufacturing the insulation member 1.

First, a first layer 27 of cover material is provided. It may e.g. be in the form a sheet or a web rolled off from a roll.

Thereafter, the insulation body 3 is placed on the first layer 27 of cover material. The insulation body 3 is in an uncompressed state having the second thickness $t_2$.

In order to obtain the desired three-dimensional shape of the insulation member 1, the first layer 27 of cover material may be placed in a first mould 29 having a cavity with a predefined shape corresponding to that of the desired shape of the insulation body 3. The insulation body 3 is then placed on top of the first layer 27 of cover material in the first mould 29.

Then, a second layer 31 of cover material is provided. It may e.g. be in the form a sheet or a web rolled off from a roll. The second layer 31 may be separate from the first layer 27, e.g. forming two different sheets or webs. As an alternative, a single sheet or a single web may be folded around the insulation member 1, thus forming both the first 25 and second 27 layers of cover material. As yet an alternative, the cover material may be provided as a tube and the insulation body 3 being inserted into the tube. In the two latter cases, the above-mentioned seal 13 will only partly surround the chamber portion 7.

As a next step, the insulation body 3 is compressed in a compression unit 33 to reach a non-expanded state.

The first 27 and second 31 layers of cover material are sealed by means of a sealing unit 35 while applying a pressure less than atmospheric pressure, thereby forming the cover 5 with the yieldable chamber portion 7 enclosing the insulation body 3, wherein the pressure inside the chamber portion 7 is less than atmospheric pressure. The cover 5 further has a shape such that it comprises at least one attachment portion 15, 17.

Compressing of the insulation body 3 and sealing may be performed in a common step. Thereby the compression unit 33 and the sealing unit 35 may be combined as in FIG. 4. If using the above-mentioned mold 29, the insulation body 3 is located in the mold 29 during compression and sealing. A mating second mold with a suitable cavity may be used to shape the second 31 layer of cover material. As an alternative, the second mold may be flat or a flat surface of the combined compression and sealing unit 33, 35 may be utilized, as is illustrated in FIG. 4.

Usually the dimensions of the cover 5 are larger during the step of compression and sealing than for the ready product illustrated in FIG. 1. Therefore, the cover 5 may be cut by a cutting unit 37 to obtain the predefined shape of the insulation member 1 including the above-mentioned attachment portions 15, 17, which shape is illustrated in FIG. 1. The optional step of cutting may be combined with the step of sealing or be combined with the both the steps of compressing and sealing.

As an alternative to cutting, the first 27 and second 31 layers of cover material may be provided pre-cut, i.e. having the desired shape, e.g. as pre-cut sheets.

As an option, the above-mentioned step of sealing, or a separate additional sealing step, may comprise providing the attachment portion seals 21, 25 around the attachment portions 15, 17. This may help to reinforce the attachment portions 15, 17.

As an option, the method may comprise providing at least one aperture 19, 23 and/or indicium for an aperture in the attachment portion 15, 17. In that case, the above-mentioned step of sealing, or a separate additional sealing step may as an option comprise providing the aperture seal mentioned above.

In the insulation member 1, see FIGS. 1 and at the right-hand side of FIG. 4, the first layer 27 of cover material and the second layer 31 of cover material are two-dimensional mirror images as seen in planes parallel to the x-y plane. The insulation member 1 is in its non-expanded state having the first thickness $t_1$.

If utilizing the above-mentioned first mould 29, the extension in the z-direction of the first layer 27 of cover material is usually larger than that of the second layer 31 in the non-expanded state, illustrated in FIG. 1. It may even be so that the second layer 31 forms a substantially planar surface having a negligible extension in the z-direction.

As an alternative, as mentioned above, it would be possible to instead use two moulds, one for the first layer 27 of cover material and one for the second layer 31. In that case, the first 27 and second 31 layers of cover material may have the same extension in the z-direction, thus forming three-dimensional mirror images.

Further modifications of the invention within the scope of the appended claims are feasible. As such, the present invention should not be considered as limited by the embodiments and figures described herein. Rather, the full scope of the invention should be determined by the appended claims, with reference to the description and drawings.

The invention claimed is:

1. An insulation member for a hollow space of a vehicle bodywork, said insulation member comprising:
   an expandable insulation body; and
   a gas-impermeable cover, said cover comprising a yieldable chamber portion enclosing said expandable insulation body,
   wherein said cover further comprises at least one attachment portion adapted for attachment to said vehicle bodywork,
   wherein said insulation member has a non-expanded state and an expanded state,
   wherein in the non-expanded state of said insulation member a pressure inside of said chamber portion is less than atmospheric pressure; and
   wherein said insulation member is configured to be transitioned from the non-expanded state to the expanded state by allowing air to enter the chamber portion of said cover so that the enclosed insulation body expands.

2. The insulation member according to claim 1, wherein said attachment portion protrudes in relation to said chamber portion, wherein said attachment portion extends at least 10 millimeters (mm) from said chamber portion as measured along a surface of said attachment portion.

3. The insulation member according to claim 1, wherein said attachment portion comprises at least one aperture and/or indicium for an aperture.

4. The insulation member according to claim 1, wherein said chamber portion is at least partly surrounded by a seal, said seat having a width in the range of from 1 mm to 20 mm.

5. The insulation member according to claim 1, wherein said attachment portion is at least partly surrounded by an attachment portion seal.

6. The insulation member according to claim 3, wherein said aperture and/or indicium for an aperture is at least partly surrounded by an aperture seal.

7. The insulation member according to claim 1, wherein said cover comprises a first layer of cover material joined to a second layer of cover material with said insulation body located in between said first and second layers of cover material.

8. A vehicle comprising:
a vehicle bodywork with a hollow space, and
an insulation member according to claim 1, wherein said insulation member is arranged in said hollow space, such that said at least one attachment portion is used to hold said insulation member in a predefined position in said hollow space.

9. The vehicle according to claim 8, wherein said insulation member in an at least partly expanded state at least partly fills said hollow space.

10. A method of mounting an insulation member according to claim 1, in a hollow space of a vehicle bodywork, said method comprising:
inserting said insulation member in said non-expanded state into said hollow space,
attaching said attachment portion to said vehicle bodywork, and
allowing gas to enter said chamber portion, said insulation member thereby expanding to said at least partly expanded state, in which it at least partly fills said hollow space.

11. A method of manufacturing an insulation member, said method comprising:
providing a first layer of gas-impermeable cover material,
providing an expandable insulation body on top of said first layer of cover material,
providing a second layer of gas-impermeable cover material on top of said insulation body,
compressing said insulation body, and
scaling said first and second layers of cover material around said insulation body while said insulation body is compressed, and while applying a pressure less than atmospheric pressure thereby forming a cover with a yieldable chamber portion enclosing said insulation body, wherein pressure inside said chamber portion is less than atmospheric pressure, said cover further providing at least one attachment portion.

12. The method according to claim 11, further comprising:
cutting said first and second layers of cover material to obtain a predefined shape of said insulation member.

13. The method according to claim 11, wherein said compressing and sealing are performed at the same time.

14. The method according to claim 11, further comprising:
providing at least one aperture and/or indicium for an aperture in said attachment portion, and as an option, providing an aperture seal at least partly surrounding said aperture and/or indicium for an aperture.

15. The method according to claim 11, farther comprising:
providing at least one of an aperture or an indicium for an aperture in the at least one attachment portion, and
providing an aperture seal at least partly surrounding the at least one of the aperture or the indicium for the aperture.

* * * * *

UNITED STATES PATENT AND TRADEMARK OFFICE
CERTIFICATE OF CORRECTION

PATENT NO. : 10,272,853 B2
APPLICATION NO. : 15/458216
DATED : April 30, 2019
INVENTOR(S) : Martin Hellgren et al.

Page 1 of 1

It is certified that error appears in the above-identified patent and that said Letters Patent is hereby corrected as shown below:

In the Claims

Column 11, In Claim 4, Line 3, replace "seat" with "seal";

Column 12, In Claim 11, Line 9, replace "scaling" with "sealing"; and

Column 12, In Claim 15, Line 1, replace "farther" with "further".

Signed and Sealed this
Second Day of July, 2019

Andrei Iancu
*Director of the United States Patent and Trademark Office*